March 9, 1926. 1,576,252
C. W. SPONSEL
MOTION CONVERTING DEVICE
Filed July 7, 1924
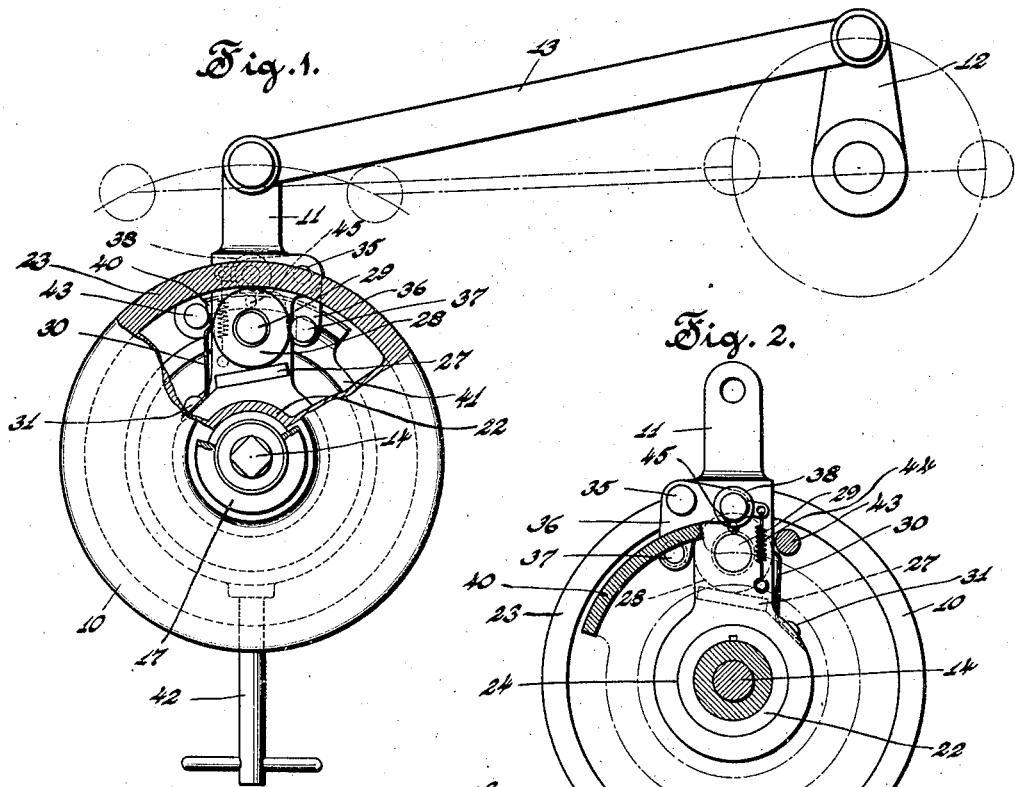
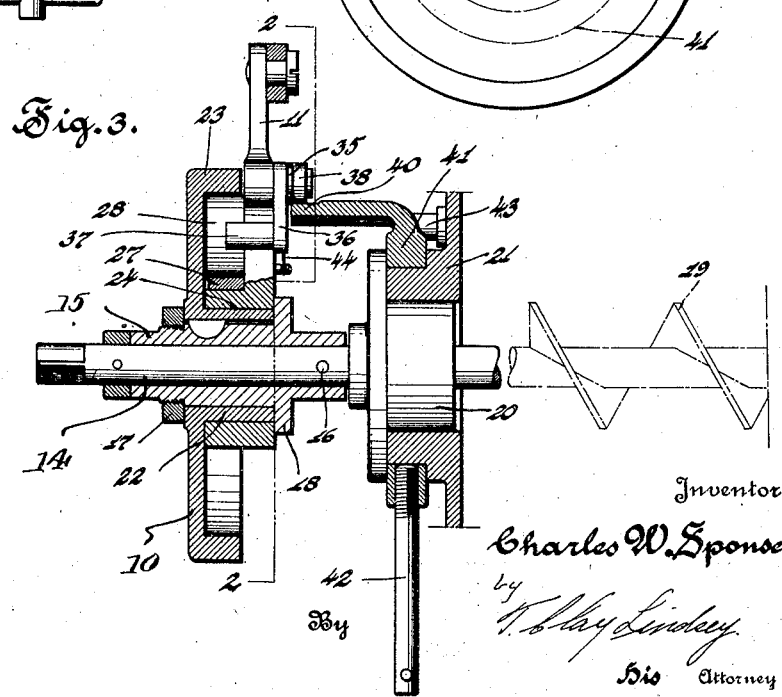
Inventor
Charles W. Sponsel
By
His Attorney Patented Mar. 9, 1926.

1,576,252

UNITED STATES PATENT OFFICE.

CHARLES W. SPONSEL, OF WETHERSFIELD, CONNECTICUT.

MOTION-CONVERTING DEVICE.

Application filed July 7, 1924. Serial No. 724,586.

*To all whom it may concern:*

Be it known that I, CHARLES W. SPONSEL, a citizen of the United States, and a resident of Wethersfield, county of Hartford, State of Connecticut, have invented certain new and useful Improvements in Motion-Converting Devices, of which the following is a specification.

This invention relates to a device for translating or converting reciprocating or oscillating movement of one member into rotary movement of another member.

As an instance of a use to which the present invention may be applied, reference may be had to automatic stoking mechanism for furnaces, as, for instance, wherein a screw is employed to feed the fuel to the fire grate, the screw being intermittently rotated by means of a crank acting through a one-way clutch. It is to be understood, however, that, while my improvements are peculiarly adapted for such use, they are not limited thereto, and the invention is susceptible of various modifications and changes, and that the present disclosure is by way of illustration only and it is not to be taken as restrictive of my conception.

An object of the invention is to provide an improved device of this sort wherein the intermittent rotary movement of a driven member may be very readily and accurately regulated or varied with respect to the movement of the driving member.

A further object of the invention is to provide a device of the character described of such construction and arrangement that the rate of rotation of the driven member may be varied at will and with precision without varying the extent of throw or travel of the reciprocating or driving member.

A further object of the invention is to provide a motion converting device which is very simple in construction, which may be easily regulated without disturbing or stopping the operation of the parts, and which is very effective in operation.

Other objects will be in part obvious and in part pointed out more in detail hereinafter.

The invention accordingly consists in the features of construction, combination of elements and arrangements of parts which will be exemplified in the construction hereinafter set forth, and the scope of the application of which will be indicated in the appended claims.

In the accompanying drawings, wherein I have shown, for illustrative purposes, one of the many embodiments which the invention may take:

Figure 1 is a front view of the device with a portion of the disk or driven member broken away for purposes of illustration;

Fig. 2 is a rear view of what is shown in Fig. 1 with parts broken away on line 2—2 of Fig. 3; and Fig. 3 is a longitudinal central view through the device.

Referring to the drawings in detail, the driven member is shown as being in the form of a disk 10, and the driving member as an oscillating arm 11. The arm or driving member 11 may be oscillated in any suitable manner as, for instance, by means of a constantly rotating crank 12 acting through a pitman or link 13. The driven member is secured in suitable manner to a shaft 14. In the present illustrative disclosure, the driven member 10 is keyed to a sleeve 15 which is fixed to the shaft 14 so as to rotate therewith by a pin 16. The disk 10 is held against longitudinal movement relative to the sleeve 15 by a nut 17 and the flange 18. The shaft 14, which is intermittently rotated as hereinafter described more in detail, may be connected up to any suitable mechanism which is to be actuated. For purposes of illustration, it may be taken as having a screw on one end, such as is provided in a furnace for feeding the fuel to the fire grate. In the drawings, this screw is shown diagrammatically by dotted lines, it being indicated by the numeral 19. The shaft 14 is journalled in a suitable bearing 20 carried by a fixed casing or plate 21.

The disk shaped driven member 10 has a hub 22 fitting the sleeve 15 and has, at its outer edge, a cylindrical flange or rim 23. The arm 11 has a bearing 24 which receives the hub 22. Carried by the arm 11 is an angularly disposed block 27 between which and the inner circumference of the disk 10 is interposed an element adapted to connect the arm 11 and the disk 10 when the arm is moved in one direction, but adapted to permit the arm to move in the opposite direction without affecting the disk. In the present instance, this element is in the form of a roller 28. If desired, the roller may be centrally apertured to receive a stud 29 projecting from the arm 11. The pin will fit loosely in the roller so that the latter may have the desired movement with respect to the arm and the disk 10. The roller is normally urged up the inclined block 27 and in contact with the inner circumference of the rim 23 in suitable manner, as, for example, by means of a leaf spring 30 one end of which engages behind the roller and the other end of which is secured to the arm, as at 31.

In accordance with the present invention, I provide means for controlling the driving engagement of the roller between the arm 11 and the disk 10 to thereby vary or regulate the extent of rotation of the shaft 14 upon the operative stroke of the arm 11 and which operative stroke, in the present illustrative disclosure, is constant. To this end, I pivot to the arm 11, as at 35, a lever 36 carrying at one end a pin or projection 37 which engages the roller 28 at a point opposite the spring 30. On the other arm of the lever 36 is journalled an anti-friction roller 38 which is adapted to ride upon an angularly adjustable segment 40. The surface of this segment upon which the roller 38 is adapted to roll is concentric to the shaft 14. The segment is carried by a ring 41 having a bearing on a hub of the plate 21. Screwed into this ring and adapted to engage the hub is a clamping bolt 42 by means of which the segment may be angularly adjusted and locked in any position of adjustment. For the purpose of limiting the extent of adjustment of the segment in one direction, the plate or casing 21 carries the stop pin 43. The lever 36 is normally urged in a direction to hold the anti-friction roller 37 out of engagement with the roller element 28 by means of a spring 44, one end of which is connected to the arm 11 and the other end to the horizontal arm of the lever 36. For the purpose of limiting the extent to which the lever 36 can be rocked about its pivot by the spring 44, there is provided on the rear face of the arm 11 a stop pin 45.

The operation of the device is briefly as follows: If a maximum rotary movement of the feed shaft 14 is desired, the regulator or segment 40 will be angularly adjusted to the right to an extreme position, referring to Fig. 1, so that during the entire operative stroke of the arm 11 the roller 28 will be in wedged and, therefore, driving engagement with the block 27 and the rim 23. If a minimum rotary or feeding movement of the shaft 14 is desired, the segment will be adjusted to the position shown in Fig. 1, that is, with its forward end in engagement with the stop pin 43. The segment will then hold the lever 36 for almost the entire length of the operative stroke of the arm 11 in such position that the pin or projection 37 will maintain the roller element 28 out of driving engagement between the block 27 and the rim 23. As the arm 11 approaches the end of its operative stroke, the anti-friction roller 38 will ride off of the forward end of the segment 40 and, thereupon, the spring 44 will rock the lever 36 in a direction to withdraw the pin or projection 37 from the roller element 28 so that the spring 30 can force this roller element into wedged or driving engagement between the block 27 and the rim. During the remainder of the operative stroke of the arm 11, this arm and the disk 10 will move in unison. It is, of course, obvious that the segment 40 may be adjusted in any intermediate position, depending on the desired extent or rate of rotation of the shaft 14.

It will be noted, from the foregoing description, that the device may be regulated with the greatest nicety and accuracy without stopping the operation of the parts and without varying the constant throw of the driving member 11. The device is composed of relatively few parts and, therefore, is of simple construction and it is very effective and durable in operation.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the langauge used in the following claims is intended to cover all of the generic and specific features of the invention herein described and all statements of the scope of the invention which, as a matter of language, might be said to fall therebetween.

I claim as my invention:

1. A motion converting device comprising a shaft, a driven member keyed to the shaft, a reciprocating member arranged for operation at one side of the driven member, said driven and reciprocating members having radial opposed portions and the reciprocating member having an inclined surface in its opposed portion, a roller loosely mounted on the reciprocating member and interposed between said opposed portions, a spring on the reciprocating member engaging the roller to normally urge it upwardly over the inclined surface for interlocking the driven and reciprocating members, a bell crank lever pivoted on the reciprocating member having a stud projecting into the space between the opposed portions of the driven and reciprocating members for engagement with the roll to retract the same against the tension of said spring, an angularly adjustable segment arranged for movement concentrically to the shaft, an anti-friction roll carried by the bell crank lever for traversing said segment to hold the bell crank lever in position to free said first roller, and a second spring carried by the reciprocating member and connected to said bell crank lever to hold the same in a direction to permit said roller to interlock the driven and reciprocating members when the anti-friction roller is free of said segment.

2. A motion converting device comprising a shaft, a driven member on the shaft having an overhanging flange, a reciprocating member mounted to move concentrically about the shaft and having an inclined bearing face disposed within and opposite to said flange of the driven member, a roller loosely mounted on the reciprocating member and disposed between the inclined face and the overhanging flange, a spring carried by the reciprocating member engaging the roller to move it upwardly over the inclined face and bind the roller between the face and the flange, a bell crank lever pivoted to the reciprocating member having on one end a stud projecting beneath the flange of the driven member for engagement with the roller to move the same against the tension of the spring, an anti-friction roller mounted on the other end of the bell crank lever, an adjustable ring arranged for movement concentrically about the shaft and having a segment lying in the path of the anti-friction roller to engage the same and hold the stud against said first roller, means for adjustably securing the segment in position, and a spring carried by the reciprocating member and engaging the bell crank lever to normally urge the anti-friction roller into the path of said segment.

3. A device of the character described, including a shaft, a disk on said shaft having a hub and a peripheral rim, a constantly rotating crank, an arm having a bearing on said hub, a pitman between said crank and arm, an inclined block carried by said arm, a roller between said block and the internal periphery of said rim, a spring carried by said arm and normally urging said roller in wedging position between said block and rim, a lever pivoted to said arm and having one end adapted to engage said roller opposite said spring, an anti-friction roller on the other end of said lever, a spring normally urging said lever in a direction to withdraw the first mentioned arm of said lever out of engagement with said roller, an angularly adjustable segment over which said anti-friction roller is adapted to ride, and means for holding said segment in any desired position of angular adjustment.

CHARLES W. SPONSEL.